United States Patent [19]

Shipley, Jr.

[11] 4,138,994
[45] Feb. 13, 1979

[54] SOLAR HEATING UNIT
[76] Inventor: Robert M. Shipley, Jr., 259 Candlelight Dr., Santa Rosa, Calif. 95401
[21] Appl. No.: 815,575
[22] Filed: Jul. 14, 1977
[51] Int. Cl.² .................................................. F24J 3/02
[52] U.S. Cl. ....................................... 126/271; 350/295
[58] Field of Search ................. 350/295; 126/270, 271

[56] References Cited
U.S. PATENT DOCUMENTS

| | | | |
|---|---|---|---|
| 3,915,147 | 10/1975 | Rineer | 126/271 |
| 3,990,430 | 11/1976 | Robertson | 126/270 |
| 4,011,855 | 3/1977 | Eshelman | 126/271 |

Primary Examiner—Carroll B. Dority, Jr.
Attorney, Agent, or Firm—Warren, Chickering & Grunewald

[57] ABSTRACT

Solar heating apparatus comprising a plurality of similar sections, each having a light-reflecting surface and providing, when opened out in an edge-to-edge position of the sections, a substantially continuous parabolic dish and providing in a closed stacked position of the surfaces an enclosure for the confronting light-reflecting surfaces. A receiver is mounted at or adjacent to the focal point of the dish in the operating, heat-collecting position of the sections.

5 Claims, 7 Drawing Figures

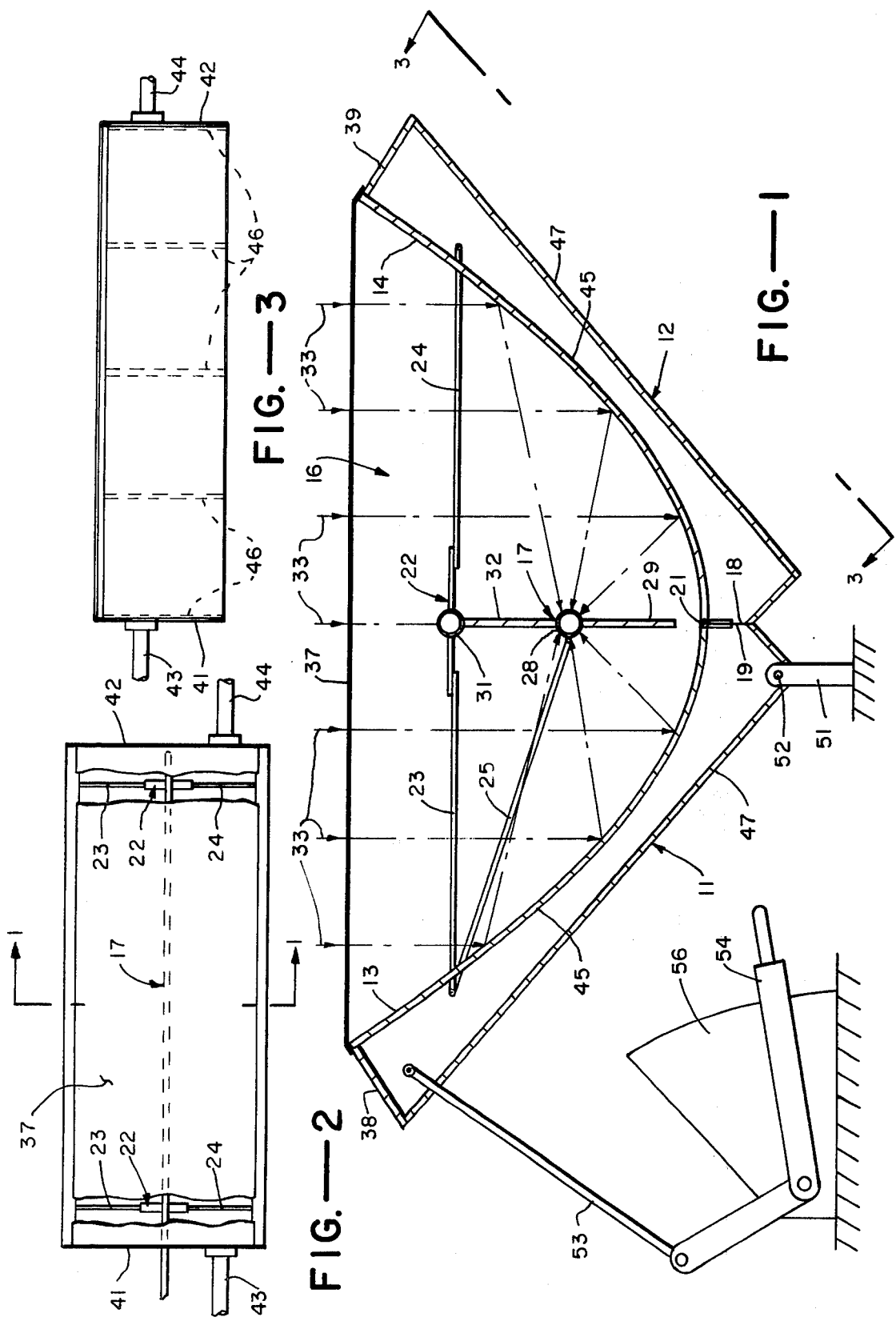

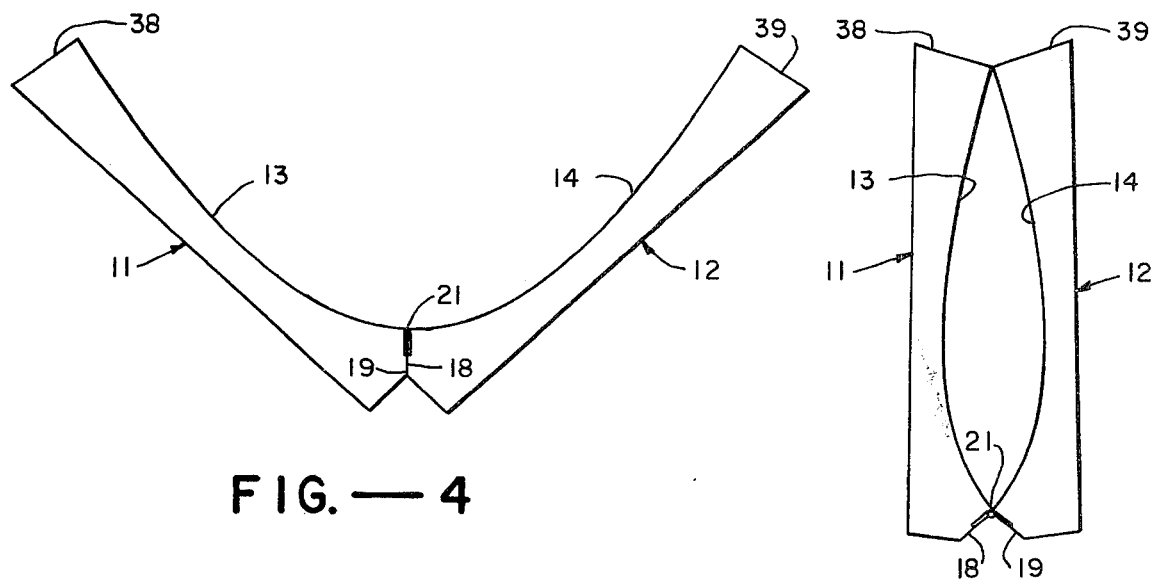
FIG.—4
FIG.—5
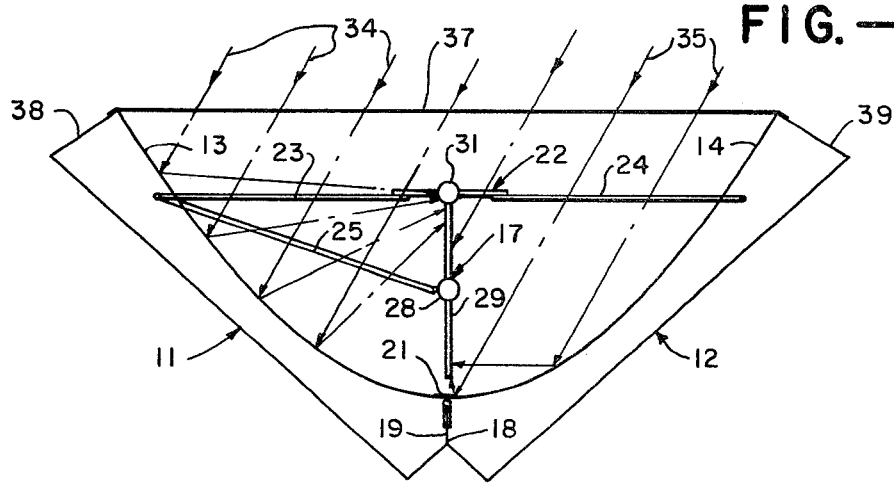
FIG.—6
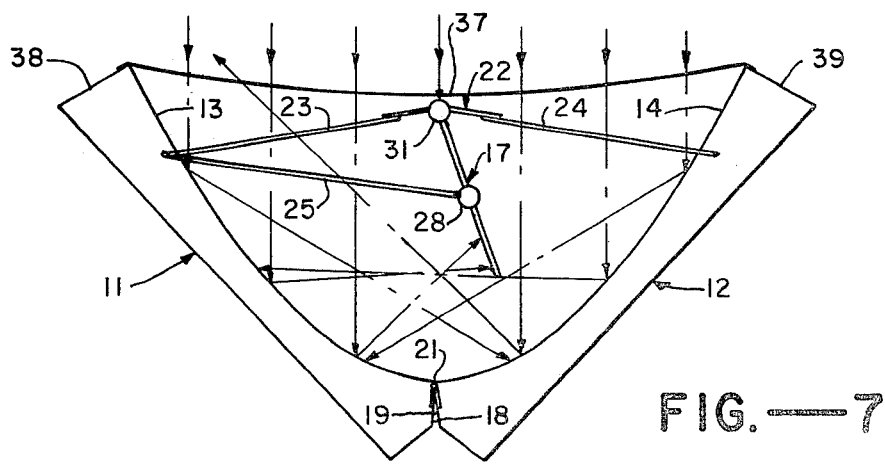
FIG.—7

SOLAR HEATING UNIT

BACKGROUND OF THE INVENTION

1. Field of Invention

The invention relates to devices for gathering and utilizing solar energy.

2. Description of Prior Art

Of the prior art developed in a search, the most pertinent patents are Nos. 503,004; 1,240,890; 3,178,113; 3,915,147; 3,923,039; and 3,940,430. These prior patents show solar collectors of a nature only generally similar to that shown herein, lacking specific features of advantage referred to in the Abstract and hereinafter further described and claimed.

SUMMARY OF THE INVENTION

An object of the present invention is to provide a solar heating unit of the character above which will be efficient in its operation, light in weight, yet sturdy in its construction, and afford easy handling and installation of the unit.

Another object of the present invention is to provide a solar heating unit of the character above in which the several parts are designed for assembly into a compact structure for storage and shipping and in which the fine light-reflective surfaces of the unit are fully enclosed and protected.

A further object of the invention is to provide a solar heating unit of the character described having improved light-defocusing means for automatically regulating the heat output of the unit.

Still another object of the present invention is to provide a solar heating unit of the character above which is designed for connection of a multiplicity of units in a single array for multiplying the heat output of the assembled units.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 1 is a cross-sectional view of a solar heating unit constructed in accordance with the present invention and taken substantially on the plane of line 1—1 of FIG. 2.

FIG. 2 is a plan view of the unit on a reduced scale.

FIG. 3 is a side elevation of the unit, as suggested by line 3—3 of FIG. 1.

FIG. 4 is an end elevation of the unit.

FIG. 5 is an end elevation of the unit in closed position.

FIG. 6 is an end elevation similar to FIG. 1, showing one operational position.

FIG. 7 is an end elevation similar to FIG. 6 but showing a different operational position.

DETAILED DESCRIPTION OF THE INVENTION

The solar heating unit of the present invention comprises, briefly, a plurality of similar sections 11 and 12, each having a light-reflecting surface 13 and 14 providing in a closed stacked position of the sections, see FIG. 5, and with the surfaces in confronting relation, an enclosure for the surfaces; surfaces 13 and 14 being formed to cooperatively provide, when the sections are moved to an open edge-to-edge position, as seen in FIG. 1, a substantially continuous parabolic dish 16; and a receiver 17 mounted adjacent the focal point of dish 16.

In a preferred embodiment of the present invention, as here shown, sections 11 and 12 are of elongated form and surfaces 13 and 14 are formed to cooperatively provide on juxtaposing longitudinally extending edges 18 and 19 in the open position of the sections, as seen in FIG. 1, a light-reflecting dish 16 of cylindrical parabolic form having a focal axis extending longitudinally of the dish; and receiver 17 is mounted along the focal axis thus formed. Also, and as a feature of the present invention, hinge means 21 is fastened to the sections at edges 18 and 19 so as to provide hinged movement of the sections between their open and closed positions, as seen in FIGS. 1 and 5. As will be observed, the sections, when in closed position, form an elongated box-like structure which facilitates the handling, storage and transportation of the units with complete protection to the fine polished reflector surfaces 13 and 14.

As another and important feature of the present invention, partial movement of the sections from their open position will cause a defocusing of the light rays on the receiver 17. Advantage is taken of this feature to provide regulation of the heat output of the unit. As here shown, heat-sensing means 22 is connected to the sections for effecting such displacement of the sections from open position when, and as a function of, a reduction in heat output of the unit. In the structure here shown, means 22 comprises a pair of bimetallic members mounted adjacent the opposite ends of the unit, see FIG. 1, and which are connected to sections 11 and 12 by struts 23 and 24 in a configuration whereby upward bowing of the bimetallic member will cause a drawing in of sections 11 and 12 from their open position, as depicted in FIG. 7, thus moving the members to a partially closed, defocusing position. As will be understood, surfaces 13 and 14, when in the open positions of the sections, will gather and direct incident light onto receiver 17 and as the sections move from their open position, the incident light is directed away from the normal focal axis and simultaneously the bimetal member will physically displace the receiver away from the focal axis. To further assist in the displacement of the receiver, a second strut 25 is connected between one of the sections, here section 13, and the receiver in a triangular configuration with strut 23.

As will be best seen in FIG. 1, receiver 17 comprises a pipe 28 of heat-conducting material, such as copper, and a heat-conducting fin 29 attached thereto and disposed substantially in the longitudinal center plane of the dish. Also preferably, one or more additional heat-conducting pipes 31 are included in the receiver, pipes 28 and 31 here being connected by a heat-conducting fin 32, which is disposed in the same center plane as fin 29. The receiver thus forms an array on the center plane of the device which will intercept reflected light rays when the incident light is other than normal or directly over the collector. With reference to FIG. 1, it will be noted that when the sun is directly over the collector, the light rays 33 will be focused on or near to the lower pipe 28. The extent of the vertical dimension of the receiver that is on the center plane of the device is such that the receiver will continue to intercept reflected rays as the angle of the rays moves away from normal. By way of illustration, the dimensions of the parabolic dish and reflector are such that, when the incoming sun rays are approximately 30° from normal, rays 34 striking surface 13 will be focused on the top portion of the receiver, here comprising pipe 31. Incoming rays 35 striking surface 14 will be focused on the lower portion of the receiver, here comprising fin 29. Thus, the parabolic and collector configuration, as herein depicted, is capable of efficient gathering of heat rays throughout the normally encountered angularity of incident sunlight. In the configuration here shown, bimetal members 22 are connected to and extend laterally from the upper pipe 31 and are, in turn, connected to struts 23 and 24, and strut 25 is connected to the receiver at, or adjacent to, the lower pipe 28, thus providing an effective amplified movement of the receiver out of the reflected light rays as the bimetal members displace the sections towards closed position, as seen in FIG. 7. Bimetal members 22 may thus sense the temperature of water or other fluid in pipe 31 or, alternatively, electric heating elements may be applied to the bimetal members to produce their required flexure in response to limits reached in the heating system.

Preferably, and as here shown, a flexible light-transparent cover 37 is attached to the opposite longitudinal edges 38 and 39 of the sections and spanning the open side of the dish in the open position of the sections so as to shield the interior of the dish against dust and the heat-stripping effect of wind currents, while yet permitting the defocusing movement of the sections, as above explained. Similarly, a pair of flexible, substantially imperforate sheets 41 and 42 is attached to the opposite ends of the sections for closing the opposite ends of the parabolic trough while yet permitting the defocusing movement of the sections. As a further feature of the present invention, ducts 43 and 44 are mounted in the end sheets 41 and 42 for conducting air or other gas longitudinally through the dish for the generation of usable hot air, as for room heating, during the day when the heat in the liquid conducted through pipes 28 and 31 may be stored for use at night or during periods when the weather is overcast. Drawing off of the heated air from the interior of the unit may be at a rate stabilizing the air temperature in the range of about 110° F.–130° F. Where it is desired to connect the inlet and discharge fittings of the unit at one end, pipes 28 and 31 may be connected with an elbow at the opposite end so that the return flow of fluid is within the interior of the device, shielded from the ambient air, and is additionally heated by the instant sun rays. The use of a relatively deep parabolic dish and the wide collector area, as defined by the continuous heat-conducting material in the center plane of the device between the upper pipe 31 and the bottom of fin 29, provides collection of the angular incident light, as above discussed, and also has the effect of collecting a great deal of scattered radiation, which does not occur with a small collector confined to the focal axis.

Light-reflecting surfaces 13 and 14 may here be provided on polished metal plates 45 forming the two halves of the parabolic trough or the surfaces may be provided by thin metallic or metalized sheets. These plates may be supported by a plurality of longitudinally spaced stiffeners or ribs 46 which are, in turn, connected by siding 47 to provide a heat insulation dead-air space exterior of the plates.

The individual units may be mounted in series, that is, with the end of one unit abutted directly against the end of another unit, with a plurality of units thus forming a longitudinal array and with the water or other fluid circulated through the collector being successively heated by the several units connected in series. Normally, the unit will be mounted with its longitudinal plane on an east-west line for maximum collection of solar rays during the day. Also preferably, the unit may be tilted to the horizon for optimal collection of heat rays during different times of the year. As here shown, one of the sections is pivotally secured by a mounting bracket 51 with the axis (pivot pin 52) extending substantially parallel to the longitudinal axis of the unit; and one of the sections, here section 47, is connected by link 53 to a manually operated bell crank lever 54, which will control the arcuate displacement of section 47 about pivot pin 52. Abutting of section ends 18 and 19 here provides for movement of the two sections as a unit around pivot pin 52, by lever 54, to change the angularity of reception of the sun's rays. An index plate 56 may be provided alongside of lever 54 for indicating proper positioning of the lever for different months of the year.

What is claimed is:

1. A solar heating unit comprising:
   a pair of similar sections and commuting hinge means each of said sections having a substantially flat exterior side and ends and an interior side, said interior side providing a semi-parabolic solar-collecting light-reflecting surface;
   said sections being formed and dimensioned for assembly in a closed superimposed position with said surfaces in confronting relation and with said exterior sides and ends enclosing said surfaces and providing a closed box-like stackable structure;
   said surfaces being formed to cooperatively provide when said sections are moved to an open edge-to-edge position a substantially continuous parabolic dish; and
   a receiver mounted adjacent the focal point of said dish.

2. The structure of claim 1, said sections being of elongated form and said surfaces being formed to cooperatively provide on juxtaposing longitudinally extending edges of said sections in the open position thereof a light-reflecting parabolic trough having a focal axis extending longitudinally of said dish;
   said receiver being mounted along said axis;
   said hinge means connecting said sections for movement thereof between open and closed positions; and
   a flexible light-transparent cover attached to the opposite longitudinal edges of said sections and spanning the open side of said dish in the open position of said sections and folding interiorly of said sections upon movement to closed position.

3. The structure of claim 1, and means connecting said receiver and said sections and displacing said receiver to a position cooperating with said surfaces in removing said receiver from said reflected incident light.

4. The structure of claim 2, and flexible substantially imperforate sheets attached to the opposite ends of said sections and closing the opposite ends of said dish.

5. The structure of claim 4, and ducts mounted in said end sheets for conducting a gas longitudinally through said dish.

* * * * *

UNITED STATES PATENT AND TRADEMARK OFFICE
CERTIFICATE OF CORRECTION

PATENT NO. : 4,138,994
DATED : February 13, 1979
INVENTOR(S) : Robert M. Shipley, Jr.

It is certified that error appears in the above-identified patent and that said Letters Patent are hereby corrected as shown below:

Column 1, line 11, delete "3,940,430" and insert ---3,990,430---; and

Column 4, line 27, delete "commuting" and insert ---connecting---.

Signed and Sealed this

*Twelfth* Day of *June 1979*

[SEAL]

Attest:

RUTH C. MASON
*Attesting Officer*

DONALD W. BANNER
*Commissioner of Patents and Trademarks*